P. C. MILLER.
TUBULAR GUARD FOR DUST COLLECTORS.
APPLICATION FILED MAY 20, 1907.
970,530.
Patented Sept. 20, 1910.
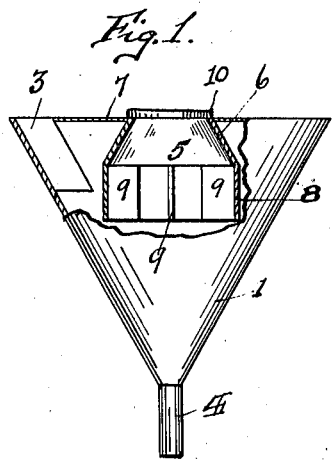
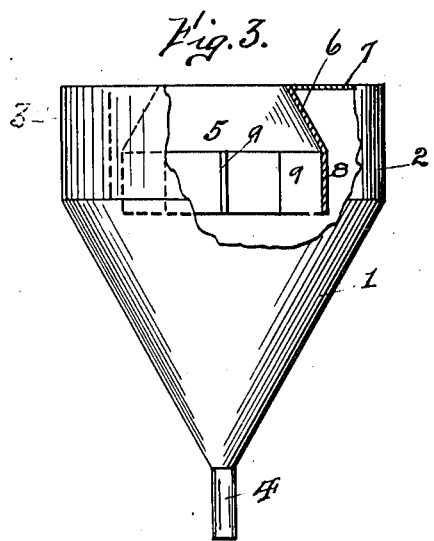
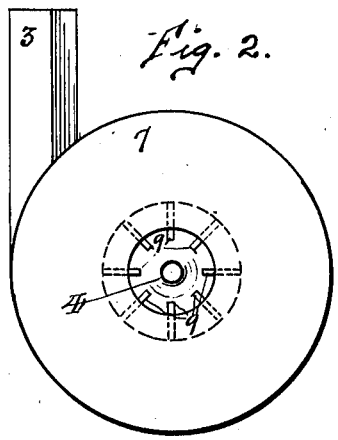
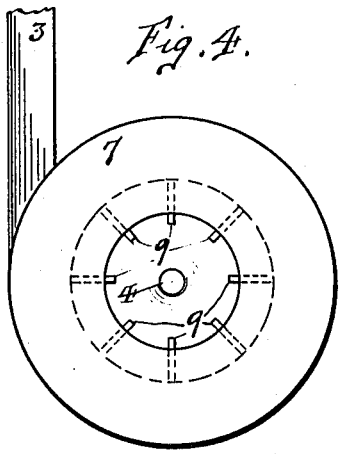
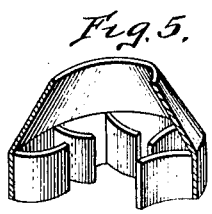
WITNESSES:
INVENTOR
Philip C. Miller
BY
Harry Lea Dodson,
ATTORNEY

UNITED STATES PATENT OFFICE.

PHILIP C. MILLER, OF CHICAGO, ILLINOIS.

TUBULAR GUARD FOR DUST-COLLECTORS.

970,530.　　　　　Specification of Letters Patent.　Patented Sept. 20, 1910.

Application filed May 20, 1907. Serial No. 374,592.

*To all whom it may concern:*

Be it known that I, PHILIP C. MILLER, a citizen of the United States, residing at Chicago, county of Cook, and State of Illinois, have invented certain new and useful Improvements in Tubular Guards for Dust-Collectors, of which the following is a specification.

My invention relates to that class of dust collectors which are used in connection with blow pipe systems where the dust is separated from the air by creating a vortex which projects the dust to the periphery of the vortex and then passes it downwardly along the sides of the conical separating chamber and then out through a dust discharge opening. Collectors of this type are usually provided with a downwardly depending tube, generally referred to as a tubular guard, which provides an exit or escape for the purified air. The escaping purified air, still retaining its whirling or gyrating movement, escapes in an annular ring adjacent the wall of the tubular guard, the central portion of said guard not being utilized by the escaping purified air. Attempts have been made to solve this difficulty by breaking up the whirl, and in a measure this is successful. But it does not always cause the air to utilize the entire area of the purified air exit.

My invention has for its object to provide a guard which will not only break up the whirl of the escaping air but will also condense the escaping air in such a manner as to cause it to utilize the entire area of the outlet, thus permitting a material reduction in the size of the said outlet without a loss in efficiency or increasing the back-pressure upon the fan.

My means of accomplishing the foregoing, may be more readily understood by having reference to the accompanying drawings, which are hereunto annexed and are a part of this specification, in which, Figure 1 is a side elevation of my improved tubular guard applied to a conical type of dust collector, a part of the exterior being broken away to show the inner construction of the improved tubular guard. Fig. 2 is a top or plan view of the same. Fig. 3 shows my improved tubular guard applied to another form of dust collector. Fig. 4 is a top or plan view of the same. Fig. 5 is an enlarged detail view of my improved tubular guard showing the curved deflectors.

Similar reference numerals refer to similar parts throughout the entire description.

In the drawings, 1 is the conical separating chamber which has, as shown in Fig. 3, a vertical cylinder 2 mounted thereon. 3 is the tangential inlet, and 4 the dust discharge opening. 5 is my improved tubular guard which is constructed of an upper tapering portion 6 extending from the top 7 of the dust collector downwardly into the separating chamber. The tapering portion extends for approximately one-half of the length of the tubular guard, the remaining portion being formed of a vertical cylindrical portion 8. To this cylindrical portion are attached baffle plates or deflectors 9. These may be straight or curved, as desired. A collar 10 may be extended slightly above the head 7 of the collector to provide a suitable mounting for an elbow, where it is desired. The result of this construction is, that the dust-laden air entering through the tangential inlet 3 is whirled rapidly around the interior of the collector, the dust being thrown to the periphery of said whirling body of air and passing down the sides of the conical separating chamber and out through the dust discharge, while the air relieved from the dust passes upwardly and out through the purified air exit; it still retains this gyrating movement, but as soon as it enters the tubular guard it is brought in contact with the deflectors 9 and the whirl is broken up. As it then passes upwardly it is brought in contact with the tapering walls 6 and the result is that it is crowded toward the center of the said guard and then forced to utilize the entire area of the opening in its escape.

Although I have illustrated the guard as attached to a specific type of dust collector, it is obvious that it can be applied to any of the well known types of dust collectors now in use.

Having described my invention, what I regard as new, and desire to secure by Letters Patent, is:

1. The combination in a dust collector with a central air escape of a downwardly depending tubular guard, the walls of the upper portion of said guard flaring downwardly and outwardly, the lower portion of said guard being cylindrical, said lower portion corresponding in diameter to the enlarged end of the flaring portion, deflectors rigidly secured to the inner walls of the said tubular guard.

2. The combination in a dust collector with a central air escape, of a downwardly depending tubular guard, the walls of the upper portion of said guard being flared downwardly and outwardly, the lower portion of said guard being cylindrical, deflectors attached to the cylindrical portion of said guard to break up the whirl of the purified air as it escapes through said guard.

3. In a dust collector, the combination of a tapering separating chamber having a dust discharge at its lower portion with a central air exit a tubular guard depending downwardly from said exit said guard consisting of a lower cylindrical portion having deflectors rigidly attached to the side walls, an upper portion extending to a contracted air exit, said portion flaring downwardly and outwardly.

P. C. MILLER.

Witnesses:
A. NELSON,
P. P. SMITH.